US008582242B2

(12) United States Patent
Sonda et al.

(10) Patent No.: US 8,582,242 B2
(45) Date of Patent: Nov. 12, 2013

(54) MAGNETIC TRANSDUCER INCLUDING BASECOAT AND OVERCOAT

(75) Inventors: Paul Julio Sonda, Minneapolis, MN (US); Edwin Frank Rejda, Bloomington, MN (US); Declan Macken, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 146 days.

(21) Appl. No.: 13/248,352

(22) Filed: Sep. 29, 2011

(65) Prior Publication Data

US 2013/0083433 A1 Apr. 4, 2013

(51) Int. Cl.
G11B 5/147 (2006.01)
G11B 5/187 (2006.01)
G11B 5/40 (2006.01)
G11B 5/60 (2006.01)

(52) U.S. Cl.
USPC ............... 360/235.1; 360/125.3; 360/125.71; 360/125.73

(58) Field of Classification Search
USPC ........ 360/235.1, 235.2, 235.3, 125.3, 125.71, 360/125.72, 125.73, 317, 128
See application file for complete search history.

(56) References Cited

U.S. PATENT DOCUMENTS

| 6,639,755 | B2 | 10/2003 | Boutaghou |
| 6,754,050 | B2 | 6/2004 | Kong |
| 6,836,389 | B2 | 12/2004 | Macken |
| 8,102,623 | B2 * | 1/2012 | Anagawa et al. .......... 360/125.3 |
| 8,233,236 | B2 * | 7/2012 | Kim et al. .................. 360/125.3 |
| 2004/0061974 | A1 * | 4/2004 | Macken et al. ............ 360/235.1 |
| 2005/0057852 | A1 * | 3/2005 | Yazawa et al. ............... 360/125 |
| 2005/0219752 | A1 * | 10/2005 | Takahashi ..................... 360/126 |
| 2005/0270694 | A1 * | 12/2005 | Umehara et al. .............. 360/126 |
| 2006/0198056 | A1 * | 9/2006 | Maruyama et al. ........ 360/235.1 |
| 2008/0218891 | A1 | 9/2008 | Gubbins |
| 2011/0058279 | A1 * | 3/2011 | Flint et al. .................. 360/235.1 |
| 2011/0116192 | A1 * | 5/2011 | Fujita et al. ................ 360/235.1 |

* cited by examiner

*Primary Examiner* — Jefferson Evans
(74) *Attorney, Agent, or Firm* — Mueting Raasch & Gebhardt PA

(57) ABSTRACT

A magnetic head that includes: a slider having a leading edge and a trailing edge; and a transducer, the transducer formed on the trailing edge of the slider and the transducer including: a substrate; a basecoat positioned adjacent the substrate, wherein the basecoat includes a material having a Young's modulus that is less than that of alumina and a coefficient of thermal expansion that is less than that of alumina; a reader; a writer; a heater; and an overcoat encasing at least a portion of the transducer, wherein the overcoat includes a material having a Young's modulus that is less than that of alumina and a coefficient of thermal expansion that is less than that of alumina.

18 Claims, 4 Drawing Sheets

MAGNETIC TRANSDUCER INCLUDING BASECOAT AND OVERCOAT

BACKGROUND

Advances in magnetic recording head technology are often drive by a desire to increase the areal density in the hard drive, which is the number of bits that can be written and/or read to the storage medium in a given length, area, or volume. One method that has been utilized to increase the areal density is heater-based actuation of the magnetic transducer. Heater-based actuation of the transducer has allowed hard drive designers to attain smaller spacing between the transducer and the magnetic media, thereby increasing the areal density.

When heater-based actuation is utilized, new engineering challenges to balance reliability with the performance increase arrive. Before heater-based actuation, the spacing goal to maximize areal density was relatively clear: set the slider fly targets as low as possible while still ensuring sufficient reliability. When using heater-based actuation, minimizing the zero-heat (or "passive") clearance isn't as important and instead, the optimal fly height is one where the lowest flying heads still require heater actuation to reach the operating (or "active") clearance target while the highest flying heads don't require so much heat as to violate temperature reliability limits. Further advances in transducer design may allow this goal to be attained.

SUMMARY

Disclosed herein is a magnetic head that includes: a slider having a leading edge and a trailing edge; and a transducer, the transducer formed on the trailing edge of the slider and the transducer including: a substrate; a basecoat positioned adjacent the substrate, wherein the basecoat includes a material having a Young's modulus that is less than that of alumina and a coefficient of thermal expansion that is less than that of alumina; a reader; a writer; a heater; and an overcoat encasing at least a portion of the transducer, wherein the overcoat includes a material having a Young's modulus that is less than that of alumina and a coefficient of thermal expansion that is less than that of alumina.

Also disclosed herein a magnetic device that includes a substrate; a basecoat positioned adjacent the substrate, wherein the basecoat includes a material having a Young's modulus that is less than about 150 GPa and a coefficient of thermal expansion that is less than about $7.0 \times 10^{-6}/°$ C.; a reader; a writer, positioned adjacent the reader; a heater; and an overcoat encasing at least a portion of the magnetic device, wherein the overcoat includes a material having a Young's modulus that is less than about 150 GPa and a coefficient of thermal expansion that is less than about $7.0 \times 10^{-6}/°$ C.

Also disclosed is a disc drive that includes an actuator arm; a suspension connected to the actuator arm; a magnetic head, the magnetic head including a slider having a leading edge and a trailing edge; and a transducer, the transducer formed on the trailing edge of the slider and the transducer including a substrate; a basecoat positioned adjacent the substrate, wherein the basecoat includes a material having a Young's modulus that is less than that of alumina and a coefficient of thermal expansion that is less than that of alumina; a reader; a writer; a heater; and an overcoat encasing at least a portion of the transducer, wherein the overcoat includes a material having a Young's modulus that is less than that of alumina and a coefficient of thermal expansion that is less than that of alumina; and a flexure, wherein the slider of the magnetic head is connected to the suspension via the flexure

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
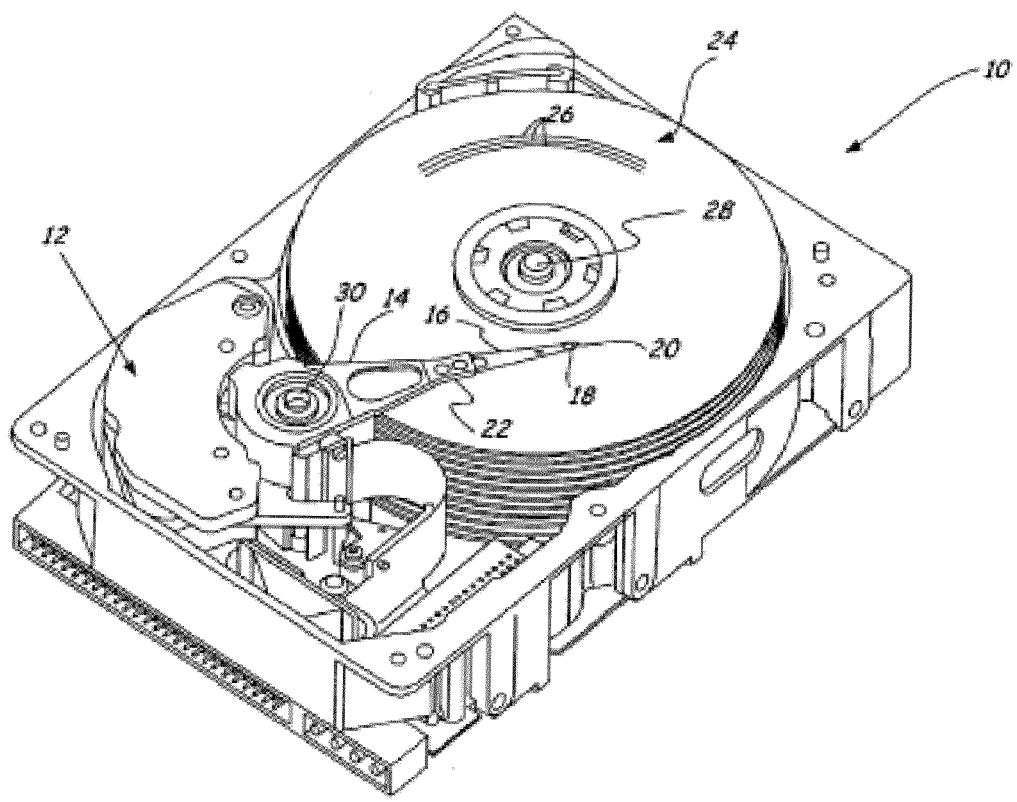
FIG. 1 shows a top perspective view of a disc drive actuation system for positioning a slider over tracks of a disc.

FIG. 1 shows a top perspective view of a disc drive 110, which includes a voice coil motor (VCM) 112, an actuator arm 114, a suspension 116, a flexure 118, a slider 120, a head mounting block 122, and a disc 124. Slider 120 is connected to a distal end of suspension 116 by flexure 118. Suspension 116 is connected to actuator arm 114 at head mounting block 122. Actuator arm 114 is coupled to VCM 112. As shown on the right side of FIG. 1, disc 124 has a multiplicity of tracks 126 and rotates about an axis 128.

During operation of disc drive 110, rotation of disc 124 generates air movement which is encountered by slider 120. This air movement acts to keep slider 120 aloft a small distance above the surface of disc 124, allowing slider 120 to fly above the surface of disc 124. VCM 112 is selectively operated to move actuator arm 114 around an axis 130, thereby moving suspension 116 and positioning a transducer (not shown) carried by slider 120 over tracks 126 of disc 124. Proper positioning of the transducer is necessary for reading and writing data on concentric tracks 126 of disc 124.

Figure 2:
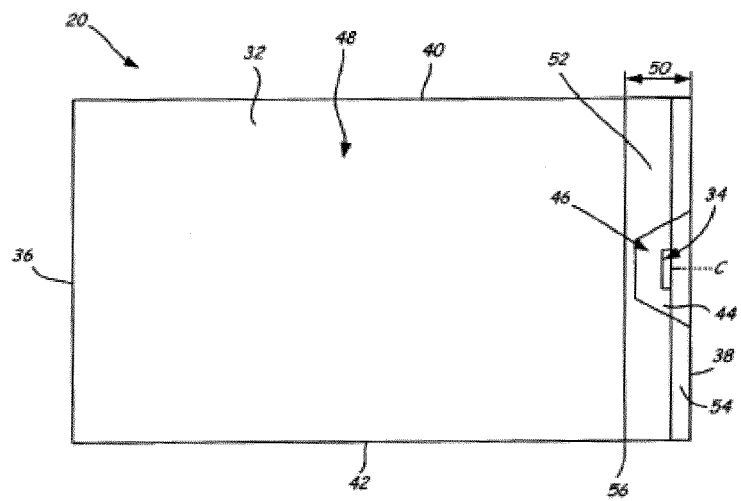
FIG. 2 is a bottom view of an embodiment of a slider disclosed herein.

FIG. 2 is a bottom view of air bearing slider 120. Slider 120 has a gimbal opposing face or top surface (not shown) which is attached to flexure 118. Slider 120 also has a disc opposing face 132 carrying a transducer 134 which faces disc 124 to read and write data from the disc. In addition, slider 120 has a leading edge 136 and an opposite trailing edge 38 which extend between the top surface and disc opposing face 132 of slider 120. A first side edge 140 and a second side edge 142 extend between leading edge 136 and trailing edge 138 of slider 120.

During normal operation, the slider generally maintains an ultra low fly height over disc 124 while disc drive 110 is in operation. While slider 120 is flying over disc 124 (FIG. 1) during operation, head media spacing (HMS) between transducer 134 and disc 124 can be substantially constant to accurately read and write data to and from the disc.

Disc opposing face 132 of slider 120 defines an air bearing surface 144 (ABS) of the slider. Air bearing surface 144 is the reference level for slider 120. In slider 120 shown in FIG. 2, an air bearing pad 146, shown as a center rail, is positioned adjacent trailing edge 138 of slider 120. Although not shown in FIG. 2, other components such as a cross rail, a channel, or first and second rear portions having an ABS may be formed on the disc opposing face of slider 120, and other components such as air channels recessed from the ABS may be formed in disc opposing face 132.

Figure 3:
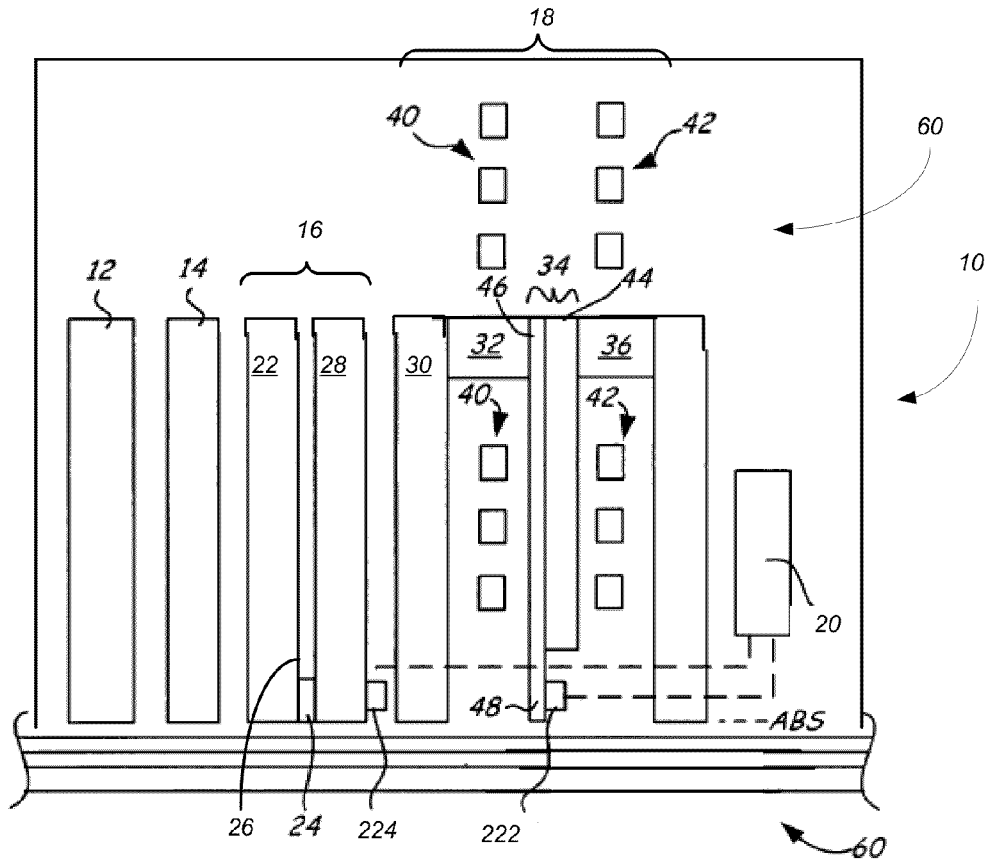
FIG. 3 is a cross-section view of a transducer as disclosed herein.

FIG. 3 is a cross-sectional view of transducer 10, which includes substrate 12, basecoat 14, reader 16, writer 18, and heater 20. Reader 1 includes bottom shield structure 22, read element 24, read gap 26, and top shield structure 28. Writer 18 includes first return pole 30, first magnetic stud 32, main pole 34, second magnetic stud 36, second return pole 38, first conductive coil 40, and second conductive coil 42. Main pole 34 includes yoke 44 and main pole body 46 including main pole tip 48. Heater 20 can generally be configured to heat the reader 16, the writer 18, or both.

The substrate 12 is typically formed of a material such as AlTiC, TiC, Si, SiC, $Al_2O_3$, or other composite materials formed of combinations of these materials. The reader 16 and the writer 18 may be fabricated in any of a number of ways and configurations known to one of skill in the art. Reader 16 and writer 18 can generally each be multi-layered devices, which are stacked upon basecoat 14 adjacent the ABS of transducer 10. Reader 16 is formed on basecoat 14, and writer 18 is stacked on reader 16 in a piggyback configuration in which layers are not shared between the two elements. In other embodiments not illustrated, reader 16 and writer 18 may be arranged in a merged-head configuration (in which layers are shared between the two elements) and/or writer 18 may be formed on basecoat 14, with reader 16 being formed on writer 18.

Reader 16 and writer 18 are carried over the surface of magnetic medium 60, which is moved relative to transducer 10 as indicated by arrow A such that main pole 34 trails first return pole 30, leads second return pole 38, and is used to physically write and/or read data to or from magnetic medium 60. Reader 16 generally functions when magnetic flux from a surface of magnetic medium 60 causes rotation of a magnetization vector of read element 24, which in turn causes a change in electrical resistivity of read element 24. In order to write data to magnetic medium 60, current is caused to flow through second conductive coil 42. The magnetomotive force in the coils causes magnetic flux to travel from main pole tip 48 perpendicularly through the magnetic medium and through second return pole 38 and first magnetic stud 36 to provide a closed magnetic flux path. The direction of the write field at the medium confronting surface of main pole tip 48, which is related to the state of the data written to magnetic medium 60, is controllable based on the direction that the current flows through second conductive coil 30.

Figure 4:
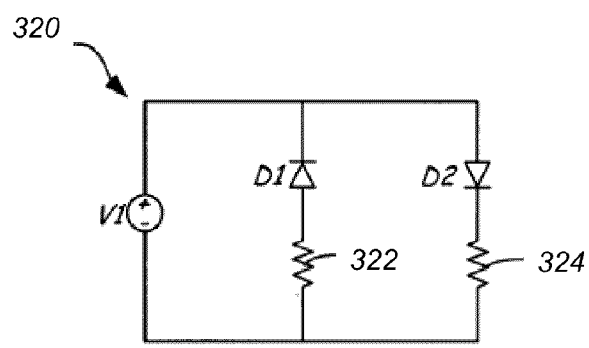
FIG. 4 is a schematic of an exemplary heater circuit.

The heater 20 may be integrated into transducer 10 in order to control the distance or spacing between transducer 10 and magnetic medium 60. Heating the transducer 10 (or portions thereof) causes it to expand and move closer to magnetic medium 60. FIG. 4 is a schematic of a microelectronic heater circuit 320, which includes voltage source V1, first diode D1, writer heater 322, second diode D2, and reader heater 324. The writer heater circuit includes diode D1 and writer heater 322 connected in series, and the reader heater circuit includes diode D2 and reader heater 324 are connected in series. The writer heater circuit and the reader heater circuit are connected in parallel across voltage source V1. Heater circuit 320 is shown generally as a block in FIG. 3 for ease of illustration, but in implementation would include diodes D1 and D2 patterned on top of writer 18. Also, in FIG. 3 writer heater 222 is shown disposed adjacent to main pole tip 48 and reader heater 224 is shown disposed adjacent to top shield 28, but writer heater 222 and reader heater 224 may alternatively be formed within layers of transducer 10, or formed on a side of transducer 10 opposite ABS. The heater 20 may also be of other configurations not disclosed herein.

Disclosed transducers, such as that disclosed in FIG. 3 as transducer 10, can include a basecoat 14. The basecoat 14 can be made of a material that has a Young's modulus that is less than alumina ($Al_2O_3$), that is at least about 40% less than that of alumina, or that is at least about 50% less than that of alumina. In embodiments, the basecoat 14 can be made of a material that has a Young's modulus that is less than about 200 GPa (gigaPascals), less than about 150 GPa, less than about 140 GPa, less than about 135 GPa, or less than about 131 GPa. In embodiments, the basecoat can be made of a material that has a Young's modulus that is equal to or less than about 100 GPa. In embodiments, the basecoat can be made of a material that has a Young's modulus that is about equal to about 70 GPa or about 57 GPa.

The material of the basecoat 14 can also be characterized by its coefficient of thermal expansion (CTE). In embodiments, the material can be described by the coefficient of thermal expansion at a particular temperature, for example at 20° C. The basecoat 14 can be made of a material that has a coefficient of thermal expansion at 20° C. (CTE at 20° C.) that is less than alumina ($Al_2O_3$), that is at least about 40% less than that of alumina, or that is at least about 50% less than that of alumina. In embodiments, the basecoat 14 can be made of a material that has a CTE at 20° C. that is less than about $8.0 \times 10^{-6}$/° C., less than about $7.0 \times 10^{-6}$/° C., less than about $6.5 \times 10^{-6}$/° C., less than about $6.0 \times 10^{-6}$/° C., or less than about $5.7 \times 10^{-6}$/° C. In embodiments, the basecoat 14 can be made of a material that has a CTE at 20° C. that is less than about $4.0×10^{-6}/°$ C. In embodiments, the basecoat 14 can be made of a material that has a CTE at 20° C. of about $3.20× 10^{-6}/°$ C. or $0.20×10^{-6}/°$ C.

Disclosed transducers, such as transducer 10 (in FIG. 3) can also include an overcoat 60. Once the structure of the transducer 10 shown in FIG. 3, for example (minus the overcoat 60) is formed, it can be partially or totally encased in an overcoat 60. The overcoat 60 can typically encase most of the transducer 10 but leave the main pole tip 48 protruding from the bottom (the ABS side) of the overcoat 60.

The overcoat 60 can be made of a material that has a Young's modulus that is less than alumina ($Al_2O_3$), that is at least about 40% less than that of alumina, or that is at least about 50% less than that of alumina. In embodiments, the basecoat can be made of a material that has a Young's modulus that is less than about 200 GPa (gigaPascals), less than about 150 GPa, less than about 140 GPa, less than about 135 GPa, less than about 131 GPa, or less than about 130 GPa. In embodiments, the basecoat can be made of a material that has a Young's modulus that is equal to or less than about 100 GPa. In embodiments, the basecoat can be made of a material that has a Young's modulus that is about 70 GPa or about 50 GPa.

The material of the overcoat can also be characterized by its coefficient of thermal expansion (CTE). In embodiments, the material can be described by the coefficient of thermal expansion at a particular temperature, for example at 20° C. The overcoat can be made of a material that has a coefficient of thermal expansion at 20° C. (CTE at 20° C.) that is less than alumina ($Al_2O_3$), that is at least about 40% less than that of alumina, or that is at least about 50% less than that of alumina. In embodiments, the overcoat can be made of a material that has a CTE at 20° C. that is less than about $8.0×10^{-6}/°$ C., less than about $7.0×10^{-6}/°$ C., less than about $6.5×10^{-6}/°$ C., less than about $6.0×10^{-6}/°$ C., or less than about $5.7×10^{-6}/°$ C. In embodiments, the basecoat 14 can be made of a material that has a CTE at 20° C. that is less than about $4.0×10^{-6}/°$ C. In embodiments, the basecoat 14 can be made of a material that has a CTE at 20° C. of about $3.0×10^{-6}/°$ C. or $0×10^{-6}/°$ C.

In embodiments the basecoat and the overcoat can be made of different materials, and in embodiments, both the basecoat and overcoat can be made of the same material. In embodiments, the basecoat and the overcoat can independently be made of $SiO_x$ (such as $SiO_2$), $Si_2N_2O$, or $Si_3N_4$ for example. In embodiments, the basecoat, the overcoat, or the basecoat and the overcoat can be made of $SiO_2$.

In embodiments, silicon dioxide ($SiO_2$) as the basecoat and/or overcoat material for example can offer advantages because it is typically very robust in most manufacturing processes, is readily available, and is relatively inexpensive. Furthermore, it can be recessed relative to other elements of the transducer whose media spacing may be even more important. Use of disclosed materials for the basecoat and/or overcoat can provide lower thermal pole tip protrusion which can allow for lower passive flying targets at the same reliability. Such materials can also reduce the transducer temperature rise for a given amount of heater stroke.

Basecoats and overcoats disclosed herein can be utilized within transducers that are designed to reduce the amplitude of the modulation in the flying height, increase the stiffness (or pressure) of the trailing edge, reduce the area of the ABS, or combinations thereof.

EXAMPLES

While the present disclosure is not so limited, an appreciation of various aspects of the disclosure will be gained through a discussion of the examples provided below.

Example 1

Deposition of $Al_2O_3$

Alumina was deposited using a RF-diode sputtering process with alumina as the target. The Young's Modulus was measured and found to be 131 GPa and the CTE=$5.7×10^{-6}/°$ C.

Example 2

Deposition of $SiO_2$

Silicon dioxide was deposited using a RF-diode sputtering process with $SiO_x$ as the target. The Young's Modulus was measured and found to be 70 GPa and the CTE=$3.2×10^{-6}/°$ C.

Example 3

Deposition of $SiO_2$

Silicon dioxide was deposited using silane-based plasma-enhanced chemical vapor deposition. The SiO2 was measured and had a YM=57 GPa and CTE=$0.2×10^{-6}/°$ C.

Example 4

Maximum Thermal Pole Tip Protrusion

Figure 5:
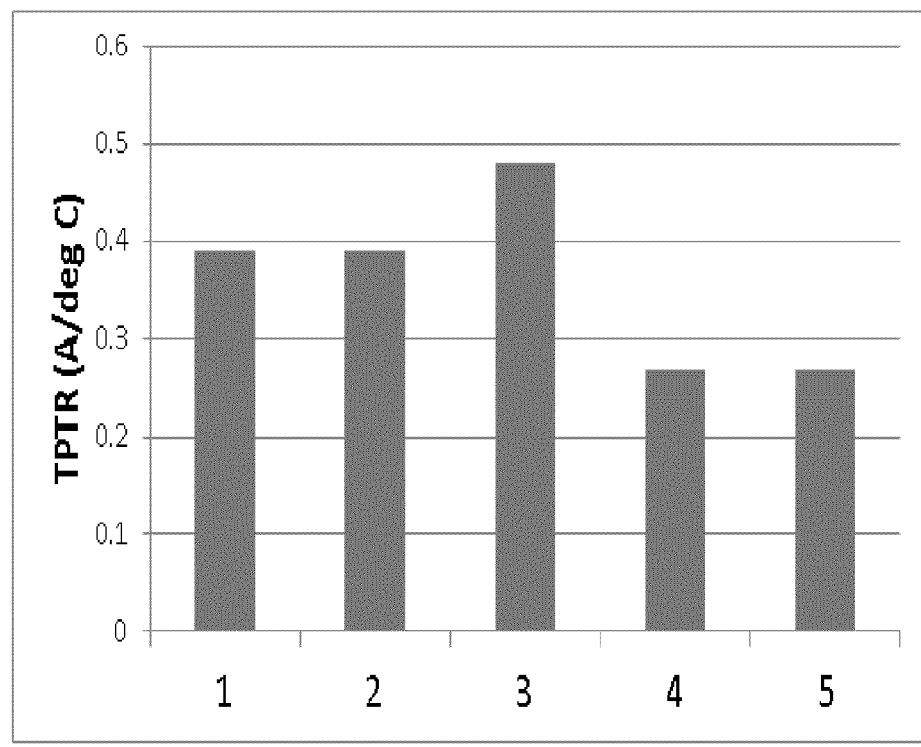
FIG. 5 is a graph showing maximum predicted thermal pole tip protrusion (TPTR) for transducers disclosed herein and comparative transducers.
Figure 6:
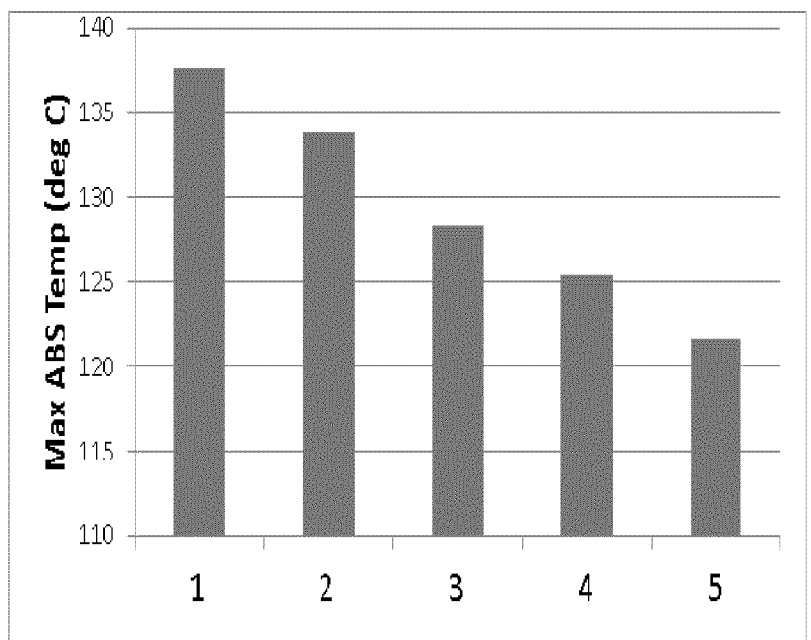
FIG. 6 is a graph showing maximum predicted ABS temperature for transducers disclosed herein and comparative transducers.
Figure 7:
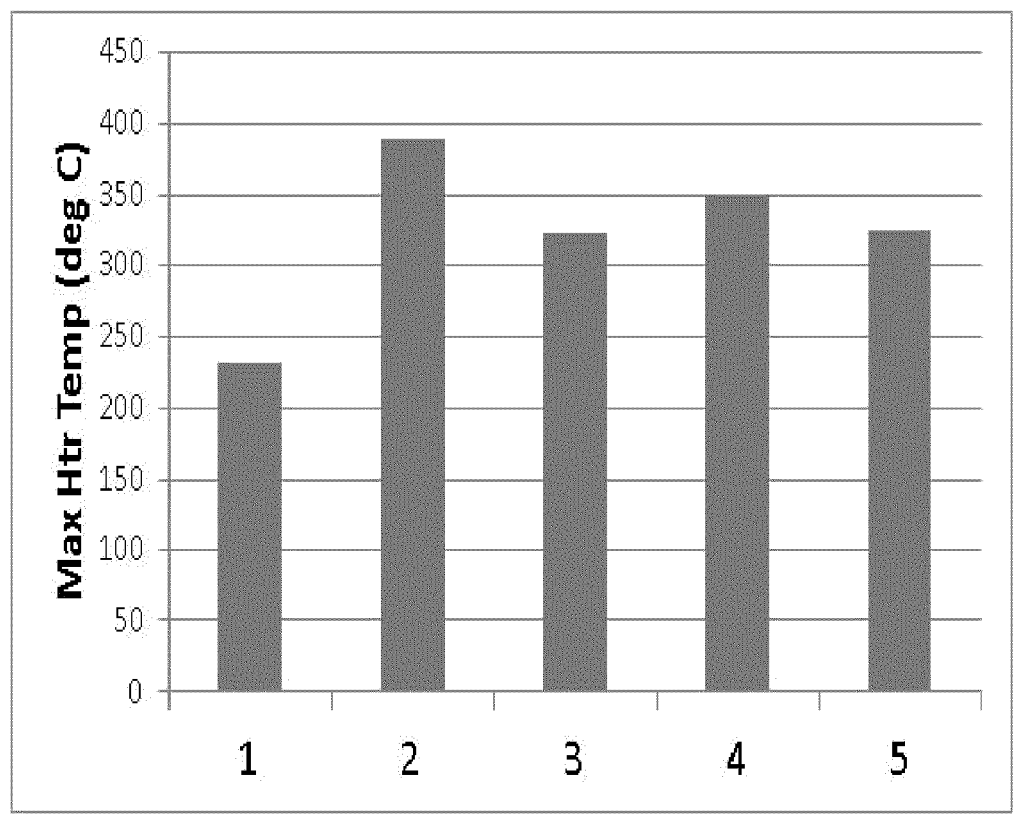
FIG. 7 is a graph showing maximum predicted heater temperature for transducers disclosed herein and comparative transducers.

Five transducer designs were modeled to determine the effect of modifying basecoat and overcoat material on thermal pole tip protrusion (TPTR), maximum slider surface temperature, and maximum heater temperature. The standard transducer design has alumina in the basecoat and overcoat. Prototype designs replace alumina with silicon dioxide in the basecoat or the basecoat and overcoat. Two air bearing designs are also considered: a standard product-class design and one with approximately twice the trailing edge pressurization, resulting in a higher stiffness. In FIGS. 5, 6, and 7, the first transducer (1) in the modeling experiment was a standard air bearing design with alumina basecoat/overcoat in the transducer; the second (2) was a high pressure design with alumina basecoat/overcoat; the third (3) was a high pressure air bearing design with a silicon dioxide basecoat; the fourth (4) was a high pressure air bearing design with a silicon dioxide basecoat and overcoat; and the fifth (5) was a high pressure air bearing design with a silicon dioxide basecoat and overcoat that was targeted at a fly height 1 nm lower than (4).

FIG. 5 shows the results of the TPTR modeling. The addition of only a silicon dioxide basecoat increases the TPTR while the addition of the overcoat and the basecoat decreases the TPTR significantly. The difference seen between 3 and 4 may have to do with the proximity of the basecoat to the "rigid" AlTiC substrate. Thus for the basecoat, the dominant material property may be the Young's modulus and since silicon dioxide's Young's modulus is lower, its protrusion is higher. For the overcoat, the dominant material property for TPTR is its low CTE. It is thought that this acts as an "anchor" thus reducing the thermal protrusion relative to the AlTiC. Reducing the TPTR can be beneficial because it reduces the lower limit of the passive fly height guardband—with all other design considerations held constant—a slider with a large positive TPTR would need to set its passive fly height target higher to compensate for fly height drops at high temperatures.

Example 5

Maximum ABS Temperature

The five transducers (1, 2, 3, 4, and 5) were modeled to determine the effect on the maximum predicted ABS temperature of replacing alumina with silicon dioxide as the basecoat, or the basecoat and overcoat. FIG. 6 shows the results of the modeling. As seen in FIG. 6, transducer 1 has a maximum ABS temperature that is above a defined reliability limit. Transducer 2 provides a slight reduction to the maximum ABS temperature, due to higher cooling at the air bearing surface. The addition of silicon dioxide basecoat (3 versus 2) reduces the maximum ABS temperature significantly. This is thought to be due to silicon dioxide's lower Young's modulus. As seen in FIG. 6 the lowest maximum ABS temperature was predicted when silicon dioxide is used as both the basecoat and the overcoat. In such a transducer, the transducer is cooler for a given amount of stroke due to the basecoat, and the lower TPTR (seen in FIG. 5) allows a lower passive fly height to be targeted, thus reducing the mean amount of heater power to operational clearance.

Example 5

Maximum Heater Temperature

The five transducers (1, 2, 3, 4, and 5) were modeled to determine the effect on the maximum predicted heater temperature of replacing alumina with silicon dioxide as the basecoat, or the basecoat and overcoat. FIG. 7 shows the results of the modeling. As seen in FIG. 7, the maximum heater temperature will rise precipitously. As shown in Examples 3 and 4, replacing the basecoat and overcoat with silicon dioxide can reduce the temperatures for a given amount of heater stroke, thereby allowing the passive mean fly target to be lowered, thus reducing the heater power needed to reach operating clearance.

Thus, embodiments of MAGNETIC TRANSDUCERS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A magnetic head comprising:
a slider having a leading edge and a trailing edge; and
a transducer, the transducer formed on the trailing edge of the slider and the transducer comprising:
   a substrate;
   a basecoat positioned adjacent the substrate, wherein the basecoat comprises a material having a Young's modulus that is less than about 200 GPa and a coefficient of thermal expansion that is less than about $8.0 \times 10^{-6}/° C.$;
   a reader;
   a writer;
   a heater; and
   an overcoat encasing at least a portion of the transducer, wherein the overcoat comprises a material having a Young's modulus that is less than about 200 GPa and a coefficient of thermal expansion that is less than about $8.0 \times 10^{-6}/° C.$ 2. The magnetic head according to claim 1, wherein the basecoat comprises a material having a Young's modulus that is at least 40% less than about 200 GPa and a coefficient of thermal expansion that is at least 40% less than about $8.0 \times 10^{-6}/° C.$; and the overcoat independently comprises a material having a Young's modulus that is at least 40% less than about 200 GPa and a coefficient of thermal expansion that is at least 40% less than about $8.0 \times 10^{-6}/° C.$ 3. The magnetic head according to claim 1, wherein the basecoat comprises a material that has a Young's modulus that is less than about 130 GPa and a coefficient of thermal expansion that is less than about $5.7 \times 10^{-6}/° C.$; and the overcoat independently comprises a material that has a Young's modulus that is less than about 130 GPa and a coefficient of thermal expansion that is less than about $5.7 \times 10^{-6}/° C.$ 4. The magnetic head according to claim 1, wherein the basecoat and the overcoat are made of the same material.

5. The magnetic head according to claim 4, wherein the material of the basecoat and the overcoat have a Young's modulus that is equal to or less than about 100 GPa and a coefficient of thermal expansion that is equal to or less than about $4.0 \times 10^{-6}/° C.$ 6. The magnetic head according to claim 1, wherein the basecoat and the overcoat materials are independently chosen from $SiO_2$, $Si_2N_2O$, and $Si_3N_4$.

7. The magnetic head according to claim 1, wherein the basecoat and the overcoat material are both $SiO_2$.

8. The magnetic head according to claim 1, wherein the substrate comprises AlTiC.

9. The magnetic head according to claim 1, wherein the overcoat material has a coefficient of thermal expansion that is equal to or less than about $4.0 \times 10^{-6}/° C.$; and the basecoat material has a Young's modulus that is less than about 100 GPa.

10. The magnetic head according to claim 1, wherein the overcoat material has a coefficient of thermal expansion that is equal to or less than about $3.2 \times 10^{-6}/° C.$; and the basecoat material has a Young's modulus that is equal to or less than about 70 GPa.

11. A magnetic device comprising:
a substrate;
a basecoat positioned adjacent the substrate, wherein the basecoat comprises a material having a Young's modulus that is less than about 150 GPa and a coefficient of thermal expansion that is less than about $7.0 \times 10^{-6}/° C.$;
a reader;
a writer, positioned adjacent the reader;
a heater; and
an overcoat encasing at least a portion of the magnetic device, wherein the overcoat comprises a material having a Young's modulus that is less than about 150 GPa and a coefficient of thermal expansion that is less than about $7.0 \times 10^{-6}/° C.$ 12. The magnetic device according to claim 11, wherein the basecoat comprises a material that has a Young's modulus that is less than about 130 GPa and a coefficient of thermal expansion that is less than about $5.7 \times 10^{-6}/° C.$; and the overcoat independently comprises a material that has a Young's modulus that is less than about 130 GPa and a coefficient of thermal expansion that is less than about $5.7 \times 10^{-6}/° C.$ 13. The magnetic head according to claim 11, wherein the basecoat and the overcoat are made of the same material.

14. The magnetic head according to claim 13, wherein the material of the basecoat and the overcoat have a Young's modulus that is equal to or less than about 100 GPa and a coefficient of thermal expansion that is equal to or less than about $4.0 \times 10^{-6}$/° C.

15. The magnetic head according to claim 11, wherein the basecoat and the overcoat materials are independently chosen from $SiO_2$, $Si_2N_2O$, and $Si_3N_4$.

16. The magnetic head according to claim 11, wherein the basecoat and the overcoat material are both $SiO_2$.

17. A disc drive comprising:
 an actuator arm;
 a suspension connected to the actuator arm;
 a magnetic head, the magnetic head comprising
  a.) a slider having a leading edge and a trailing edge; and
  b.) a transducer, the transducer formed on the trailing edge of the slider and the transducer comprising:
  a substrate;
  a basecoat positioned adjacent the substrate, wherein the basecoat comprises a material having a Young's modulus that is less than about 200 GPa and a coefficient of thermal expansion that is less than about $8.0 \times 10^{-6}$/° C.;
  a reader;
  a writer;
  a heater; and
  an overcoat encasing at least a portion of the transducer, wherein the overcoat comprises a material having a Young's modulus that is less than about 200 GPa and a coefficient of thermal expansion that is less than about $8.0 \times 10^{-6}$/° C.; and
 a flexure, wherein the slider of the magnetic head is connected to the suspension via the flexure.

18. The disc drive according to claim 17, wherein the basecoat and the overcoat materials are independently chosen from $SiO_2$, $Si_2N_2O$, and $Si_3N_4$.

* * * * *